June 30, 1953 J. C. O'BRIEN 2,644,084

DISCRIMINATOR IMPROVEMENT TO REDUCE AUDIO-FREQUENCY NOISE

Filed Sept. 2, 1948 2 Sheets-Sheet 1

INVENTOR.
J. C. O'Brien,
BY Neil W. Preston,
his ATTORNEY

June 30, 1953 J. C. O'BRIEN 2,644,084

DISCRIMINATOR IMPROVEMENT TO REDUCE AUDIO-FREQUENCY NOISE

Filed Sept. 2, 1948 2 Sheets-Sheet 2

INVENTOR.
J. C. O'Brien,
BY Neil D. Ralston,
his ATTORNEY

Patented June 30, 1953 2,644,084

UNITED STATES PATENT OFFICE 2,644,084

DISCRIMINATOR IMPROVEMENT TO REDUCE AUDIO-FREQUENCY NOISE

John C. O'Brien, Rochester, N. Y., assignor to General Railway Signal Company, Rochester, N. Y.

Application September 2, 1948, Serial No. 47,458

1 Claim. (Cl. 250—27)

This invention pertains to an improved type of discriminator to be used in a radio receiving system for the purpose of demodulating either frequency modulated or phase modulated waves.

Although the output of a frequency modulated transmitter may be unvarying in amplitude, the received signal may, by the time it reaches the discriminator stage, vary considerably in amplitude due either to atmospheric conditions or to some aberrations within the receiver. Although the function of the usual limiter stage which precedes the discriminator is to remove the amplitude variations, it is often ineffective in doing so when the input signal to the limiter stage is below its normal value. Also, the limiter may be ineffective in eliminating all amplitude variations in the event of strong static discharges and the like. This extraneous amplitude variation of a frequency modulated wave causes annoying "noise" in the receiver output.

One object of this invention, is to provide a discriminator organization in which it is possible to eliminate, to a large extent, the noise caused by these extraneous amplitude variations in a convenient and economical manner.

One type of prior art discriminator employs inversion of one of its discriminator tubes. This inversion, which involves making the cathode the output terminal of the tube, is inconvenient whenever triode or pentode type tubes are used for the discriminator tubes as it necessitates special connections and filters. Thus, another object of the present invention is to provide an organization that avoids this difficulty, and thus provides a discriminator which not only possesses the desirable feature of reducing unwanted noise but also provides a practical arrangement with regard to structural features.

Other objects, purposes, and characteristic features of the present invention will be in part obvious from the accompanying drawings, and in part pointed out as the description of the invention progresses.

For the purpose of simplifying the illustration and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific structure and arrangement of parts that would be employed in practice. Thus, the various devices are illustrated in a conventional manner. Although the phrase "frequency modulation" is used throughout in this description, it is to be understood that this discriminator works equally well with frequency modulated waves, phase modulated waves, or a combination of both.

Figure 1:
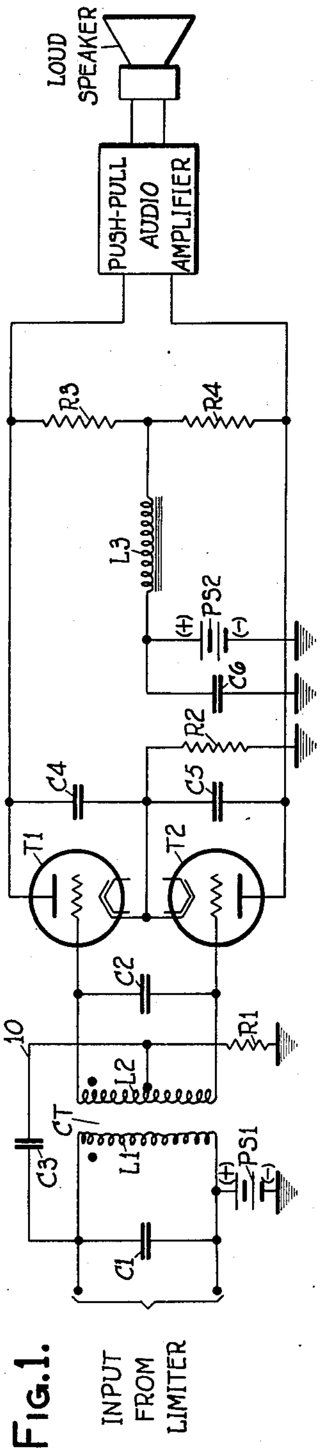
Fig. 1 illustrates in a diagrammatic manner one form of discriminator embodying the present invention and including an audio-frequency choke coil connected in the common plate-cathode circuit of the discriminator.

As the specific embodiment of the invention diagrammatically illustrated in Fig. 1 pertains to a discriminator as used in a radio receiving system, it is to be understood that numerous other radio stages precede and follow the discriminator stage shown. Thus, with reference to Fig. 1, it can be seen that the discriminator obtains its input from the preceding limiter stage of the usual radio receiver for frequency modulated signals, and the output of said discriminator is fed to the following push-pull audio amplifier, which in turn supplies an audio signal of sufficient amplitude to operate the usual loudspeaker. It should be kept in mind, however, that this invention applies equally well to discriminators when employed for other purposes, as for instance, in the frequency control of an oscillator.

Referring to Fig. 1, the output voltage of the limiter stage is applied directly to the terminals of a resonant circuit including condenser C1 and the primary winding L1 of a coupling transformer CT. The voltage appearing across the terminals of winding L1 induces a voltage in secondary winding L2 of the coupling transformer by transformer action. The windings L1 and L2 comprise a radio-frequency, air-core transformer. The voltage appearing across winding L1 is also made to appear between the center-tap of winding L2 and ground by means of connection 10 including condenser C3. The purpose of condenser C3 is to prevent the direct-current potential of plate supply battery PS1 from appearing on the grids of discriminator tubes T1 and T2. The cathodes of the discriminator tubes T1 and T2 are connected through the common cathode bias resistor R2 to ground. Resistor R1 is chosen to be of such a value as to cause the bias on the discriminator tubes to be great enough to produce rectification of the applied signal but not to be of such magnitude as to cause the discriminator output to become too low. The plates of discriminator tubes T1 and T2 are connected, respectively, to resistors R3 and R4 which provide the proper plate load impedance for the discriminator tubes T1 and T2. Resistor R1 provides a grid leak for discriminator tubes T1 and T2. The voltages appearing across resistors R3 and R4 are applied to the grids of the following push-pull audio amplifier tubes. In this connection, it should be noted that the load resistors R3 and R4 might be replaced by inductive reactors. Also, a coupling transformer having a center tap might be used between the discriminator output and the audio amplifier input without departing from the contemplated scope of the present invention. However, since resistors are more economical, the resistors R3 and R4 have been shown as the preferred form.

In Fig. 1, the junction of resistors R3 and R4 is connected to a terminal of audio-frequency choke coil L3 with the other terminal of audio-frequency choke coil L3 connected to the positive terminal of plate supply battery PS2. Condenser C6, shown connected from the junction of the audio-frequency choke coil and plate supply battery PS2 to ground, by-passes battery PS2 as far as both audio and radio frequency currents are concerned.

Figure 2:
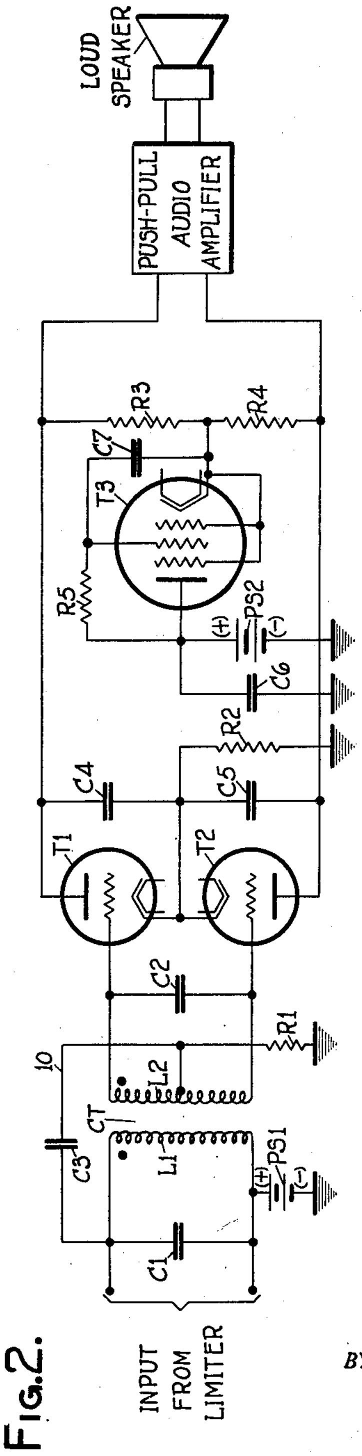
Fig. 2 illustrates diagrammatically a modified form of the circuit appearing in Fig. 1 in which modified form the audio-frequency choke coil has been replaced by a constant-current pentode.

In Fig. 2, the junction of resistors R3 and R4 has the cathode of a pentode tube T3 connected to it, while the plate of the tube T3 is connected to the positive terminal of plate supply battery PS2. The screen grid of this tube T3 is supplied with its proper potential by being connected to the plate supply PS2 through resistor R5. Battery PS2 is by-passed as far as audio and radio frequencies are concerned, by condenser C7. The suppressor and control grids of tube T3 are directly connected to the cathode. Condenser C6, shown connected from the junction of the constant-current pentode and the plate supply battery PS2 to ground, by-passes battery PS2 as far as both audio and radio frequency currents are concerned.

Figure 6:
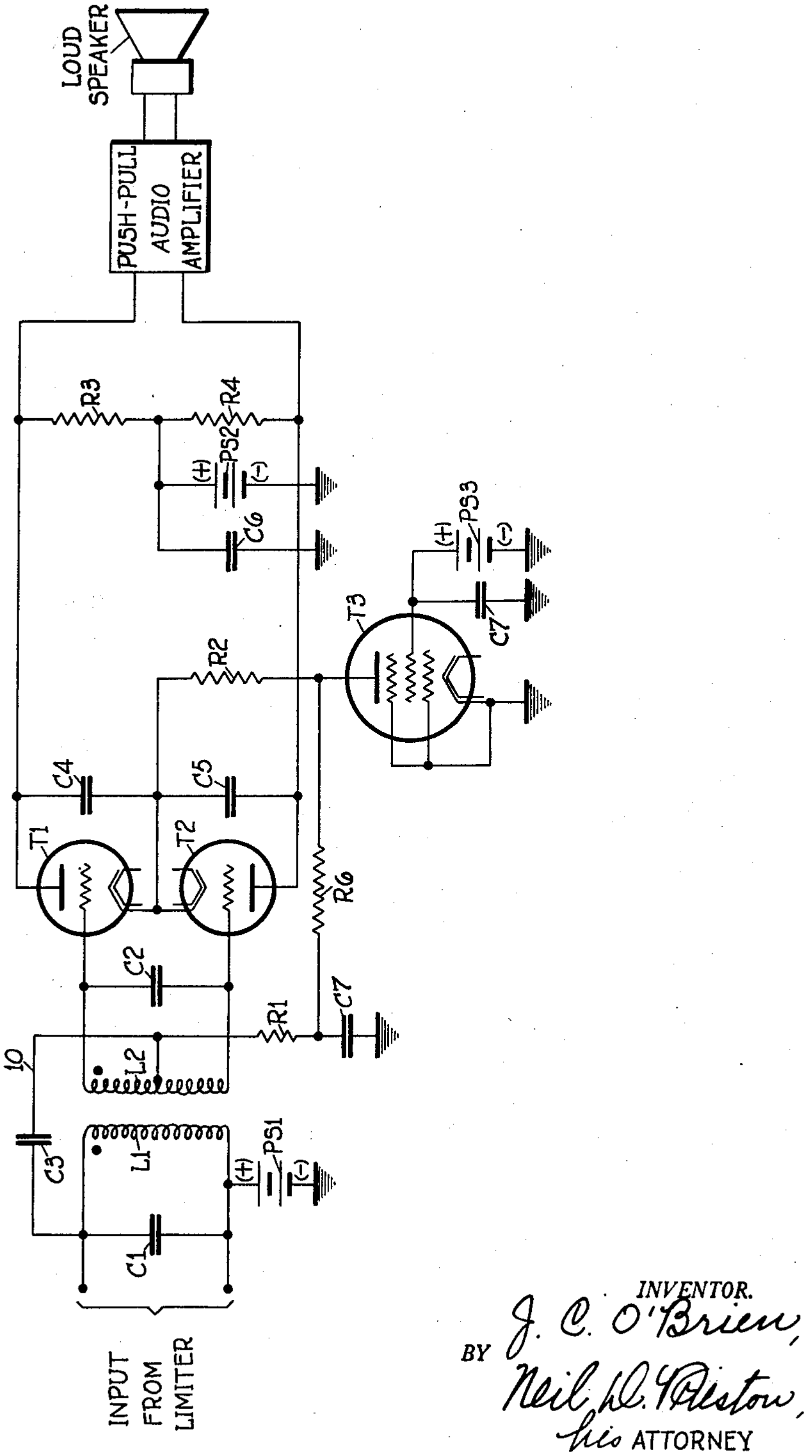
Fig. 6 illustrates diagrammatically a modified form of the circuit appearing in Fig. 2 in which modified form the constant-current pentode appears in the discriminator grid-cathode circuit.

In Fig. 6, the lower terminal of cathode resistor R2, instead of being connected directly to ground as in Figs. 1 and 2, is connected to the plate of the constant-current pentode T3. The suppressor and control grids of tube T3 are both connected to the cathode and the screen grid of tube T3 obtains its correct operating potential from battery PS3 as shown (but this potential might be obtained from battery PS2). Battery PS3 is by-passed, as far as audio and radio frequencies are concerned, by condenser C7. The lower terminal of resistor R1 is connected to ground through audio-frequency by-pass condenser C7. Resistor R6 is shown connected from the junction of resistor R1 and condenser C7 to the junction of resistor R2 and the plate of the tube T3.

In order to obtain a better general understanding of the mode of operation of this discriminator, it may be helpful to call to mind some of the basic concepts concerning frequency-modulated waves. When an unmodulated signal from a transmitter is received by the discriminator stage of a radio receiving system, it possesses an unvarying frequency known as the intermediate frequency. When, however, a modulated signal is received, its frequency varies to either side of this intermediate frequency at a rate equal to the modulating frequency and by an amount proportional to the amplitude of the modulating signal. The function of the discriminator stage is, briefly, to convert this frequency variation into a signal which is similar to the modulating wave with respect to amplitude and frequency. The resulting audio signal is then amplified to the desired level by the succeeding audio amplifier stages.

Referring to Fig. 1, the amount of coupling between the windings L1 and L2 is kept low so that the resonant frequency of each tuned circuit is determined only by the particular impedances in that circuit. In addition, the ratio of reactance to resistance in each circuit, commonly known as the "Q" of a circuit, is maintained at a relatively low value so that the voltage appearing across winding L1 varies only slightly as the frequency varies over a range near the intermediate frequency. As a result, the voltage induced in winding L2 remains nearly constant over the range of frequencies near the intermediate frequency.

For the purposes of the following discussion it will be assumed that windings L1 and L2 are wound so that they have like polarity. Thus, at the instant that the voltage applied to the terminals of winding L1 is of a certain polarity as, for instance, positive at the top of winding L1 with respect to its bottom terminal, the voltage induced in winding L2 is of the same polarity, i. e. positive at the top of winding L2 with respect to its bottom terminal. This has been indicated in the drawings by the dots adjacent the upper ends of the respective windings. It should be readily apparent that the actual relative polarity of the windings L1 and L2 is of no consequence and is mentioned only to aid in this description.

The voltage induced in the secondary winding L2 is, because of the loose coupling existing between windings L1 and L2, quite small compared to the voltage appearing across winding L1, and is the voltage which would appear across the terminals of winding L2 if condenser C2 were not in the circuit. However, because of the conditions of near resonance which exists in this circuit, the current flowing in the secondary tuned circuit is quite large and the voltages which appear across winding L2 and condenser C2 are quite large.

Figure 3:
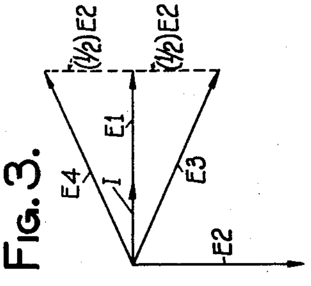
Fig. 3 is a vector diagram representing certain voltage relationships in the discriminator when a radio frequency signal of the center or intermediate frequency is being received.

At the resonant frequency of the tuned circuits (also the intermediate frequency), the total series impedance of the secondary circuit is resistive so that the current which flows is in phase with the induced voltage and is, consequently, in phase with the voltage applied to the terminals of winding L1. This is shown in Fig. 3 in which the vector I denotes the current flowing in the secondary tuned circuit and the vector E1 represents the voltage applied to the terminals of winding L1. The voltage across condenser C2, represented by the vector E2, of course lags the current vector I through condenser C2 by ninety degrees and therefore lags the voltage applied to winding L1 by ninety degrees.

In Fig. 1, it can be seen that the voltage applied to the grid and cathode of discriminator tube T1 is equal to the conductively coupled voltage plus one-half of the inductively coupled voltage, whereas the voltage appearing between grid and cathode of discriminator tube T2 is equal to the difference of those same voltages. This is because the secondary winding L2 has a center tap connection, and when one end is positive with respect to it, the other end is relatively negative.

It can be seen then, that voltages E3 and E4 represent, vectorially, the voltages appearing between grid and cathode of discriminator tubes T1 and T2, respectively, and that these voltages are, in the case of reception of an unmodulated signal, equal in magnitude.

Figure 4:
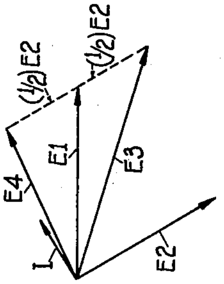
Fig. 4 is a vector diagram representing certain voltage relationships in the discriminator when a radio frequency signal below the intermediate frequency is being received.

When, however, the frequency of the incoming signal varies to either side of the incoming signal in accordance with the intelligence being received, the induced voltage in the secondary tuned circuit no longer encounters a purely resistive impedance. At frequencies below resonance the impedance has a capacitative component so that the current flowing in the tank circuit leads the induced voltage and also the voltage applied to the terminals of winding L1. This is shown in Fig. 4 in which the current in the secondary tuned circuit I is shown by vector I as leading the voltage applied to winding L1 shown as vector E1. The voltage appearing across condenser C2 of course lags the current I by ninety degrees as shown by the vector E2, with the result that the voltage (represented by vector E4) appearing between grid and cathode of discriminator tube T2 is less in magnitude than the voltage (represented by vector E3) appearing between grid and cathode of the discriminator tube T1. This can be seen by comparing the vectors E3 and E4 of Fig. 4.

Figure 5:
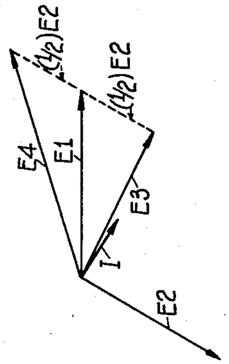
Fig. 5 is a vector diagram representing certain voltage relationships in the discriminator when a radio frequency signal above the intermediate frequency is being received.

Conversely, at frequencies above resonance the current in the secondary tuned circuit lags the voltage applied to the terminals of winding L1 as represented by the current vector I and the voltage vector E1 as shown in Fig. 5. Thus, the voltage appearing between grid and cathode of discriminator tube T2 is greater in magnitude than the voltage appearing between grid and cathode of discriminator tube T1, as represented by the vectors E4 and E3 respectively in Fig. 5.

It should be clear from the foregoing description then that the voltages appearing between grid and cathode of discriminator tubes T1 and T2 vary in magnitude by an amount proportional to the frequency deviation of the incoming modulated wave and at a frequency equal to the rate of frequency variation of the incoming wave. Thus, as the voltage increases on the grid of one discriminator tube, it decreases on the grid of the other discriminator tube as above described. Consequently, the sum of the rectified and integrated plate currents of both discriminator tubes remains relatively constant. When, however, a variation in amplitude occurs, this change of voltage appears on the grids of both discriminator tubes with the same polarity. The sum of the rectified and integrated plate currents therefore varies substantially under these conditions. This unbalance of current causes a corresponding unbalance of voltages appearing across resistors R3 and R4 which unbalance is applied to the grids of the following push-pull audio amplifier, is amplified, and appears as noise or undesired modulation in the receiver output.

The undesired amplitude variations causing noise in the receiver output are, to a large extent, removed by the limiter stage. But, as previously mentioned, the limiter stage is effective in removing these amplitude variations only when the input signal to the limiter is of a sufficient value. The unbypassed cathode resistor R2 is also very helpful in removing amplitude variation because variations of current in the common cathode circuit resulting from amplitude variations, as described above, cause voltage variations across resistor R2 which act degeneratively with respect to the gain of the discriminator tubes and thereby reduce the amplitude of the noise variations in the receiver output. This feature has been shown in my prior application Ser. No. 747,266, filed May 10, 1947, now abandoned, but it should be understood that this invention is in the nature of an improvement over my prior application, and no claim is intended to be made herein to any subject matter common with such prior application.

The above described devices all aid materially in reducing extraneous amplitude variation but are not completely effective in doing so. It is the purpose of the present invention to further limit these amplitude variations and thereby reduce the noise level in the receiver output to an optimum level.

As mentioned previously, an amplitude variation of the received signal results in current variations in the common cathode circuit of the discriminator tubes. The present invention reduces the effect of these amplitude variations by tending to keep the current in the common plate cathode circuit at a constant value with the result that the noise caused variations in voltage do not appear across the plate load resistors R3 and R4. To accomplish this purpose, a so-called constant-current impedance is placed in the common plate-cathode circuit of the discriminator tubes.

In the embodiment shown in Fig. 1, this constant-current impedance takes the form of an audio frequency choke L3 for, according to Lenz' law, a varying current in an inductance produces an induced voltage in the inductance which tends to oppose the variations in current. The audio-frequency choke coil may also, of course, be placed in the common cathode circuit of discriminator tubes T1 and T2 in series with resistor R2. Since the direct current resistance of such a choke coil is relatively small compared to the value of cathode resistor R2, its presence does not appreciably affect the bias voltages appearing on the control grids of tubes T1 and T2. However, as the impedance of the choke coil to audio frequencies is considerable, the audio voltage appearing across the choke coil when it is placed in the common grid-cathode circuit acts degeneratively with respect to the gain of the discriminator so that it further minimizes amplitude variations in the output.

The modified form of the invention shown in Fig. 2 employs a pentode type radio tube. This form of the invention makes use of the fact that the plate current of a pentode type radio tube is nearly independent of the plate voltage and that this condition is only slightly effected by grid voltage. For this reason, the control grid of the pentode-type constant-current tube T3 is shown connected directly to the cathode.

In the embodiment shown in Fig. 6, the constant-current pentode has been placed in the grid-cathode circuit of the discriminator tubes. As the direct-current resistance of the pentode is relatively high in comparison with the magnitude of the resistance of resistor R2 used in the grid-cathode circuit to obtain self-bias, the network comprising resistors R6 and R1 and condenser C7 is employed to prevent the relatively large direct-current potential appearing across tube T3 from being applied as a bias to tubes T1 and T2 as it would cause the output of the discriminator to be substantially reduced. Thus, it can be seen that the direct-current bias voltage is determined only by resistors R2, R6, and R1 as that is the only path for direct current. Because of the presence of audio-frequency by-pass condenser C7, noise-caused variations in the voltage appearing across the pentode tube simultaneously appear across the series combination of resistor R6 and condenser C7 which is in parallel with tube T3. As condenser C7 has a low reactance to audio frequencies relative to the magnitude of resistor R6, most of the audio voltage appearing across tube T3 also appears across resistor R6. It is apparent that this audio voltage appearing across resistor R6 is applied between grid and cathode of the discriminator tubes in such a manner as to act degeneratively with respect to the gain of the discriminator so that noise caused by amplitude variations is effectively reduced.

From the above description, it is readily apparent that this invention, in either of the embodiments shown, operates to reduce noise caused by amplitude variations as it tends to limit variations of current in the plate cathode circuits of the discriminator tubes which are the direct result of amplitude variations of the received signals.

Having described a discriminator for radio receiving systems adapted to receive frequency modulated signals as one specific embodiment of the present invention, it is desired to be understood, that this form is selected to facilitate in the disclosure of the invention rather than to limit the number of forms which it may assume; and, it is to be further understood that various modifications, adaptations, and alterations may be applied to the specific form shown to meet the requirements of practice without in any manner departing from the spirit or scope of the present invention.

What I claim is:

In a discriminator organization for radio receivers adapted to the reception of frequency modulated carrier signals, a coupling transformer having resonated primary and secondary windings, said primary winding being connected to a source of frequency modulated radio signals, a connection between one terminal of said primary winding and a mid tap of said secondary winding including a capacitance adapted to pass only radio frequency signals, two triode tubes each having its control grids connected to one of the terminals of said secondary winding and having its cathodes connected together, a resistor having one end connected to said mid tap of said secondary winding and the other connected to ground to thereby provide a grid leak and to complete the grid cathode circuit, circuit means including a resistor connected between said cathodes and ground so as to be included both in the grid-cathode circuit and in the plate-cathode circuit, a load circuit connecting said plates of said tubes and including a mid tap impedance with its mid tap being connected through a common connecting portion to a source of plate supply energy and thence to ground, said common connecting portion being independent of said grid-cathode circuit, a pentode tube having constant current characteristics, said pentode tube being connected in said common connecting portion to thereby determine that the output across said load impedance is free from extraneous variations due to amplitude variations in the signals supplied to the primary windings of said coupling transformer.

JOHN C. O'BRIEN.

References Cited in the file of this patent

UNITED STATES PATENTS

| Number | Name | Date |
|---|---|---|
| 2,243,414 | Carlson | May 27, 1941 |
| 2,281,395 | Travis | Apr. 28, 1942 |
| 2,282,961 | Harris | May 12, 1942 |
| 2,351,212 | Houghton | June 13, 1944 |
| 2,540,813 | Dome | Feb. 6, 1951 |